United States Patent
Haruna et al.

(10) Patent No.: US 9,563,748 B2
(45) Date of Patent: Feb. 7, 2017

(54) DATA MANAGEMENT METHOD

(71) Applicant: Hitachi, Ltd., Tokyo (JP)

(72) Inventors: Takaaki Haruna, Tokyo (JP); Nobuaki Kohinata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 85 days.

(21) Appl. No.: 14/427,897

(22) PCT Filed: Mar. 20, 2014

(86) PCT No.: PCT/JP2014/057858
§ 371 (c)(1),
(2) Date: Mar. 12, 2015

(87) PCT Pub. No.: WO2015/141002
PCT Pub. Date: Sep. 24, 2015

(65) Prior Publication Data
US 2016/0259919 A1    Sep. 8, 2016

(51) Int. Cl.
*G06F 17/00* (2006.01)
*G06F 21/10* (2013.01)
*G06F 21/62* (2013.01)

(52) U.S. Cl.
CPC ........... *G06F 21/10* (2013.01); *G06F 21/6218* (2013.01); *G06F 2221/2113* (2013.01); *G06F 2221/2145* (2013.01)

(58) Field of Classification Search
CPC ..... G06F 21/10; H04L 63/20; H04L 29/06578
USPC .......................................................... 726/1
See application file for complete search history.

(56) References Cited

U.S. PATENT DOCUMENTS

| 6,978,370 B1 * | 12/2005 | Kocher | G06F 21/16 380/201 |
| 7,406,603 B1 * | 7/2008 | MacKay | G06F 21/10 713/189 |
| 7,788,235 B1 | 8/2010 | Yeo | |

FOREIGN PATENT DOCUMENTS

| JP | 2009-104347 A | 5/2009 |
| JP | 2009-271573 A | 11/2009 |
| WO | 2011/147887 A1 | 12/2011 |

OTHER PUBLICATIONS

Satoshi Hada and Michiharu Kudo, XML Access Control Language: Provisional Authorization for XML Documents, [online], Oct. 16, 2000, [retrieved Mar. 11, 2015], Retrieved from the Internet: <URL: http://xml.coverpages.org/xacl-spec200102.html>.

(Continued)

*Primary Examiner* — Anthony Brown
(74) *Attorney, Agent, or Firm* — Volpe and Koenig, P.C.

(57) ABSTRACT

Provided is a technology for improving the efficiency and the accuracy of data security. To this end, protection information provided to data is maintained correct even when it becomes necessary to change the necessity/non-necessity to protect the data depending on the content of a process performed on the data. More specifically, primitive data with protection attributes set thereon is read as the original data, and an operation is performed on the original data to generate derived data. Then, whether to make the derived data inherit the protection attributes of the original data is determined on the basis of a content of the operation performed on the original data.

7 Claims, 9 Drawing Sheets

(56) References Cited

OTHER PUBLICATIONS

Michiharu Kudo and Satoshi Hada XACL: XML Access Control Policy Specification Language, Technical Research Report of the Institute of Electronics, Information and Communication Engineers, Jun. 5, 2001, vol. 101, No. 110, pp. 81-88 [English translation of Abstract also provided].

* cited by examiner

| No | Data Type | Content | Protection |
|---|---|---|---|
| 1 | Name | Blank | N |
| 2 | Name | Predetermined Character String | N |
| 3 | Name | Other | Y |
| 4 | Age | Predetermined Value | N |
| 5 | Age | Other | Y |
| 6 | Height | Predetermined Value | N |
| 7 | Height |  | Y |
| ... | ... | ... | ... |
| xxx | Other | All | N |

Fig. 5

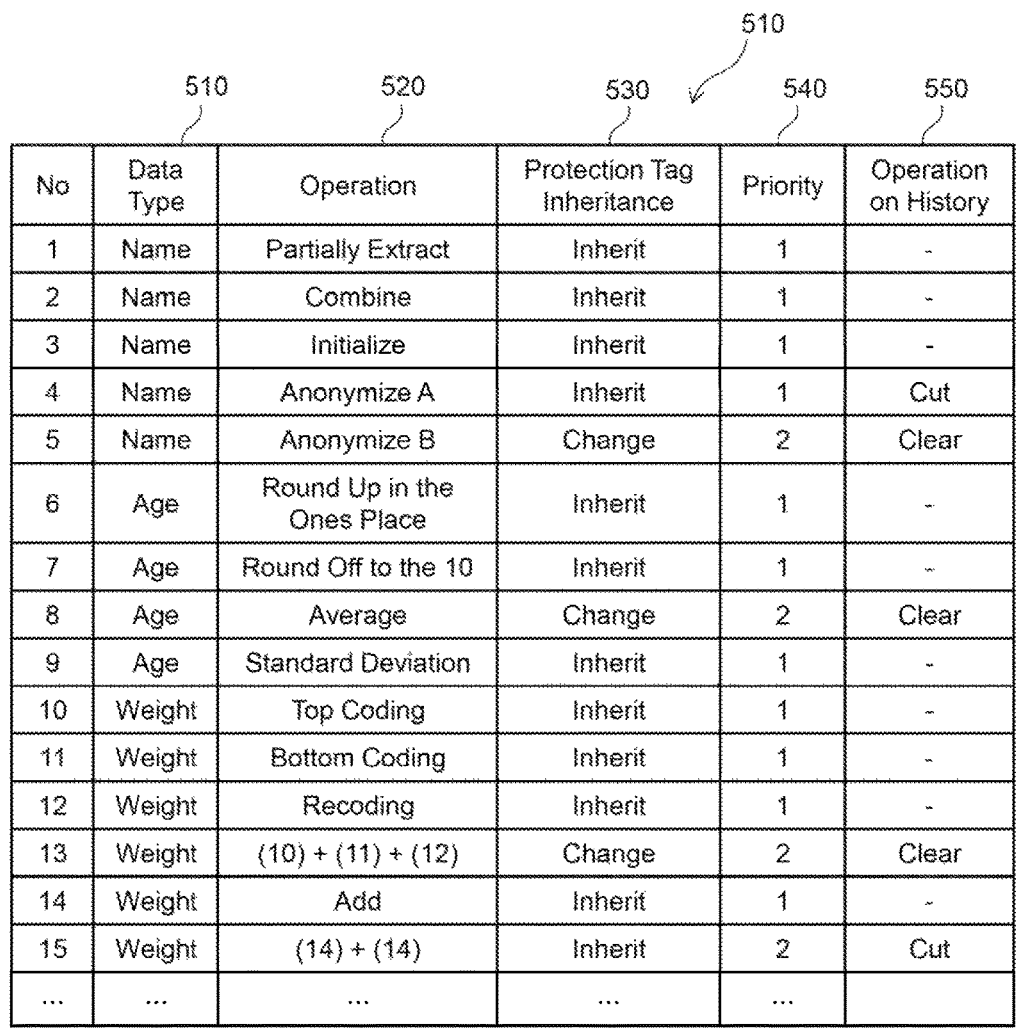

| No | Data Type | Operation | Protection Tag Inheritance | Priority | Operation on History |
|---|---|---|---|---|---|
| 1 | Name | Partially Extract | Inherit | 1 | - |
| 2 | Name | Combine | Inherit | 1 | - |
| 3 | Name | Initialize | Inherit | 1 | - |
| 4 | Name | Anonymize A | Inherit | 1 | Cut |
| 5 | Name | Anonymize B | Change | 2 | Clear |
| 6 | Age | Round Up in the Ones Place | Inherit | 1 | - |
| 7 | Age | Round Off to the 10 | Inherit | 1 | - |
| 8 | Age | Average | Change | 2 | Clear |
| 9 | Age | Standard Deviation | Inherit | 1 | - |
| 10 | Weight | Top Coding | Inherit | 1 | - |
| 11 | Weight | Bottom Coding | Inherit | 1 | - |
| 12 | Weight | Recoding | Inherit | 1 | - |
| 13 | Weight | (10) + (11) + (12) | Change | 2 | Clear |
| 14 | Weight | Add | Inherit | 1 | - |
| 15 | Weight | (14) + (14) | Inherit | 2 | Cut |
| ... | ... | ... | ... | ... | |

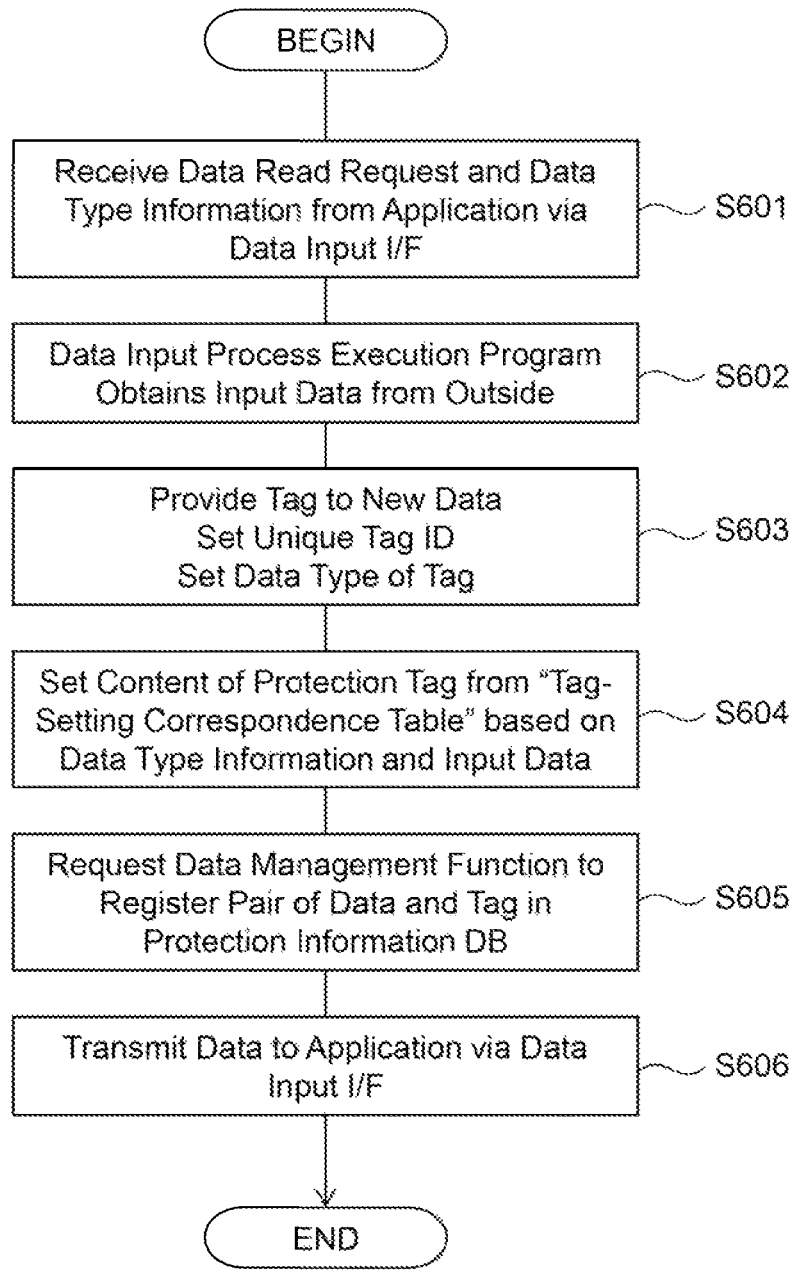

Fig. 9

| No | Application Name | Data Type | Alternative Output | Content of Alternative |
|---|---|---|---|---|
| 1 | Application A | Name | Y | Blank |
| 2 | | Age | N | - |
| 3 | | Height | N | - |
| 4 | Application B | Name | Y | "*" |
| 5 | | Age | Y | Predetermined Value |
| 6 | | Height | Y | Blank |
| 7 | Application C | Name | N | - |
| ... | ... | ... | ... | ... |
| xxx | Other | Other | N | - |

DATA MANAGEMENT METHOD

TECHNICAL FIELD

The present invention relates to a data management method, and for example, relates to a technology for protecting information, in particular, for preventing leakage of information to outsiders from a server system that stores, manages, and analyzes information, such as personal information and confidential information of enterprises.

BACKGROUND ART

In recent years, a technology for ensuring the security of a server system has become more important to prevent leakage of information, such as personal information and confidential information of enterprises, to outsiders. As such a technology, there has been proposed, as disclosed in Patent Literature 1, for example, a method of, when input data contains information that should be protected, providing a mark, which indicates that the information is the target to be protected, to the input data, and propagating the same mark for data that is newly generated as a result of processing the input data. Accordingly, it is possible to block output of the original data as well as the newly generated data to the outside.

CITATION LIST

Patent Literature

Patent Literature 1: U.S. Pat. No. 7,788,235 B

SUMMARY OF INVENTION

Technical Problem

However, according to the technology disclosed in Patent Literature 1, even when it becomes necessary to change the necessity/non-necessity to protect data depending on the content of a process performed on the data, the "protection mark" will propagate and the data will thus become the target to be protected, which is problematic in terms of the efficiency of data security. Further, as only information on whether or not data should be protected is provided as a mark, it would be impossible to correctly set a "protection mark" when the necessity/non-necessity to protect the target data is determined by the type of the data or a change of a management policy.

The present invention has been made in view of the foregoing problems, and provides a technology for efficiently implementing security protection in accordance with a change in the content of data.

Solution to Problem

In order to solve the aforementioned problem, in a computer system in accordance with the present invention, derived data, which is obtained by performing an operation on the original data with protection attributes set thereon, is made to inherit the protection attributes, so that the protection attributes of the derived data are confirmed upon receiving a request to output the data to the outside, and output of the data is thus blocked. Herein, the protection attributes set on the original data are determined from the type and the content of the original data when the original data is read. When an operation is performed on the original data, whether to make the derived data obtained thereby inherit the protection attributes of the original data is determined in accordance with the content of the operation.

Further features related to the present invention will become apparent from the description of the specification and the accompanying drawings. In addition, embodiments of the present invention can be implemented by elements, a combination of a variety of elements, the following detailed description, and the appended claims.

Advantageous Effects of Invention

According to the present invention, it is possible to maintain protection information, which is provided to data, correct even when the necessity/non-necessity to protect the data is changed depending on the content of a process performed on the data, and thus improve the efficiency and the accuracy of data security.

BRIEF DESCRIPTION OF DRAWINGS

FIG. 5 is a diagram showing an exemplary structure of a tag-updating correspondence table in accordance with an embodiment of the present invention.

FIG. 6 is a flowchart for illustrating a process performed by a data input function in accordance with an embodiment of the present invention.

FIG. 9 is a diagram showing an exemplary structure of a blocking output policy in accordance with an embodiment of the present invention.

DESCRIPTION OF EMBODIMENTS

Figure 1:
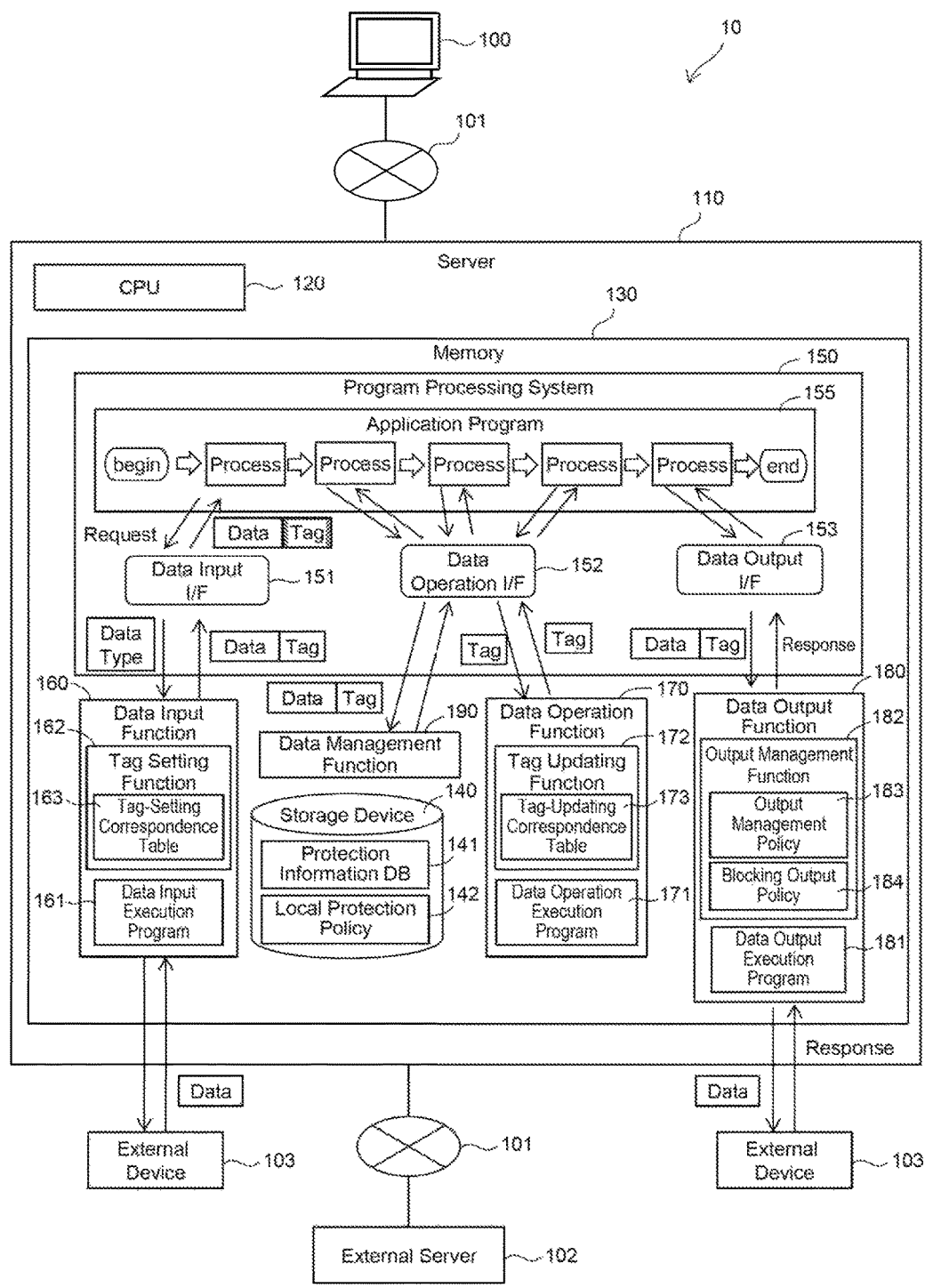
FIG. 1 is a diagram showing the configuration of a computer system in accordance with an embodiment of the present invention.

Hereinafter, embodiments of the present invention will be described with reference to the accompanying drawings. In the accompanying drawings, elements that have the same function may be denoted by the same reference numeral. Although the accompanying drawings show specific embodiments and exemplary implementations in accordance with the principle of the present invention, they are illustrative only for understanding of the present invention, and should not be used to narrowly construe the present invention.

Although this embodiment contains fully detailed descriptions for one of ordinary skill in the art to carry out the present invention, it should be appreciated that other implementations and embodiments are also possible and thus that any changes to the configurations or structures as well as replacement of a variety of elements are possible within the spirit and scope of the present invention. Thus, the present invention should not be limited to the following description.

Further, embodiments of the present invention may be implemented on any of software that runs on a general-purpose computer, dedicated hardware, or a combination of software and hardware.

In the following description, a "table" form is used to describe each information of the present invention. However, such information need not necessarily be represented by a data structure of a table. For example, such information may be represented by a data structure of a list, DB, queue, or the like. Therefore, a "table," "list," "DB," "queue," and the like may also be simply referred to as "information" to show that such information does not depend on the data structure.

In addition, representations such as "identification information," "identifier," "name," and "ID" may also be used to describe the content of each information, and such representations are interchangeable.

In the following description, each process in an embodiment of the present invention will be described as being performed by a "program" or a "function" as a subject (i.e., a subject that performs an operation). However, as a program or a function performs a predetermined process using memory and a communication port (i.e., communication control device) by being executed by a processor, description may also be made on the assumption that a process is performed by a processor as a subject. Further, a process that is disclosed as being performed by a program as a subject may also be a process that is performed by a computer, such as a management server, or an information processing device. Some or all of programs may be implemented by dedicated hardware, or implemented as a module. A variety of programs may be installed on each computer by a program distribution server or a storage medium.

<Summary of Configuration and Operation of Computer System>

FIG. 1 is a diagram showing the configuration of a computer system in accordance with an embodiment of the present invention. A computer system 10 includes an administrator terminal 100 and a server 110. The administrator terminal 100 is a terminal that is operated by an administrator.

The server 110 is connected to the administrator terminal 100 via a network 101, and includes a CPU (i.e., processor) 120, a memory 130, and a storage device 140. The CPU 120, the memory 130, and the storage device 140 are mutually connected by a bus or the like. In addition, an external server 102 is connected to the server 110 via the network 101, and an external device 103 is also connected to the server 110. It should be noted that the external server 102 is another server that is similar to the server 110, for example. In addition, the external device 103 is a user terminal that has requested display or data, for example.

The CPU 120 executes a variety of programs 150 to 170 read into the memory 130.

A program processing system 150 is a program for managing execution of an application program 155. A data input I/F 151, a data operation I/F 152, and a data output I/F 153 are interfaces that are called by the application program 155 in reading data, operating data, and outputting data, respectively. The program processing system 150 requests a data input function 160, a data operation function 170, and a data output function 180 to execute processes using the I/Fs 151 to 153, respectively.

The data input function 160 provides a tag to data, which has been received from the external server 102 or the external device 103 using a data input execution program 161, using a tag setting function 162 and a tag-setting correspondence table 163. Then, a data management function 190 stores the data into a protection information DB 141 on the storage device 140, and also delivers the data to the application program 155 via the data input I/F 151. The content of the tag will be described with reference to FIG. 2. The tag-setting correspondence table 163 will be described with reference to FIG. 4. In addition, the details of the data input function will be described with reference to FIG. 6.

The data operation function 170 performs an operation on data using a data operation execution program 171 in response to a data operation request received from the application program 155 via the data operation I/F 152, and updates the content of a tag using a tag updating function 172 and a tag-updating correspondence table 173. The tag-updating correspondence table 173 will be described with reference to FIG. 5. In addition, the details of the data operation function will be described with reference to FIG. 7.

The data output function 180 outputs data using a data output execution program 181 in response to a data output request received from the application program 155 via the data output I/F 153. It should be noted that the data output execution program 181 is called only when an output management function 182 has determined that data is allowed to be output on the basis of the content of the tag and an output management policy 183 (e.g., policy that prohibits output of data when the necessity/non-necessity of protection 225 described below indicates "Y"). The details of the data output function will be described with reference to FIG. 8.

The general flow of the overall process is described below. When a data input process is called by the application program 155, the program processing system 150 calls the data input function 160 that actually performs a data input process via the data input I/F 151. The data input function 160 causes the data input execution program 161 to execute an input process from the external device 103, the external server 102, or the like. The tag setting function 162 determines whether or not the data should be protected. Then, a tag in accordance with the determination result is provided to the data.

When a data operation process is called by the application program 155, the program processing system 150 calls the data operation function 170 that actually performs a data operation process via the data operation I/F 152. The data operation function 170 performs data processing, such as a variety of computations, using the data operation execution program 171. The tag updating function 172 sets the content of a tag provided to the resultant data in accordance with the content and the result of the data processing.

When a data output process is called by the application program 155, the program processing system 150 calls the data output function 180 that actually performs a data output process via the data output I/F 153. The data output function 180 causes the output management function 182 to determine whether or not the data to be output is the target data to be protected on the basis of the tag information provided to the data. If the data to be output is not the target data to be protected, the data output execution program 181 outputs the data to the external device 103, the external server 102, or the like. Even if the data to be output is the target data to be protected, and output of the data is thus blocked, there may be cases where some alternative output, such as a blank, is required to be provided from the nature of the application. In such a case, if the content of an alternative output is defined in advance in a blocking output policy 184, it becomes possible for the output management function 182 to cause the data output execution program 181 to provide an alternative output.

It should be noted that the system in accordance with the present invention can be applied to a data management/analysis system that handles personal information or confidential information of enterprises that should be protected in organizations, such as hospitals, enterprises, and public offices.

<Unit and Structure of Target Data to be Protected>

Figure 2:
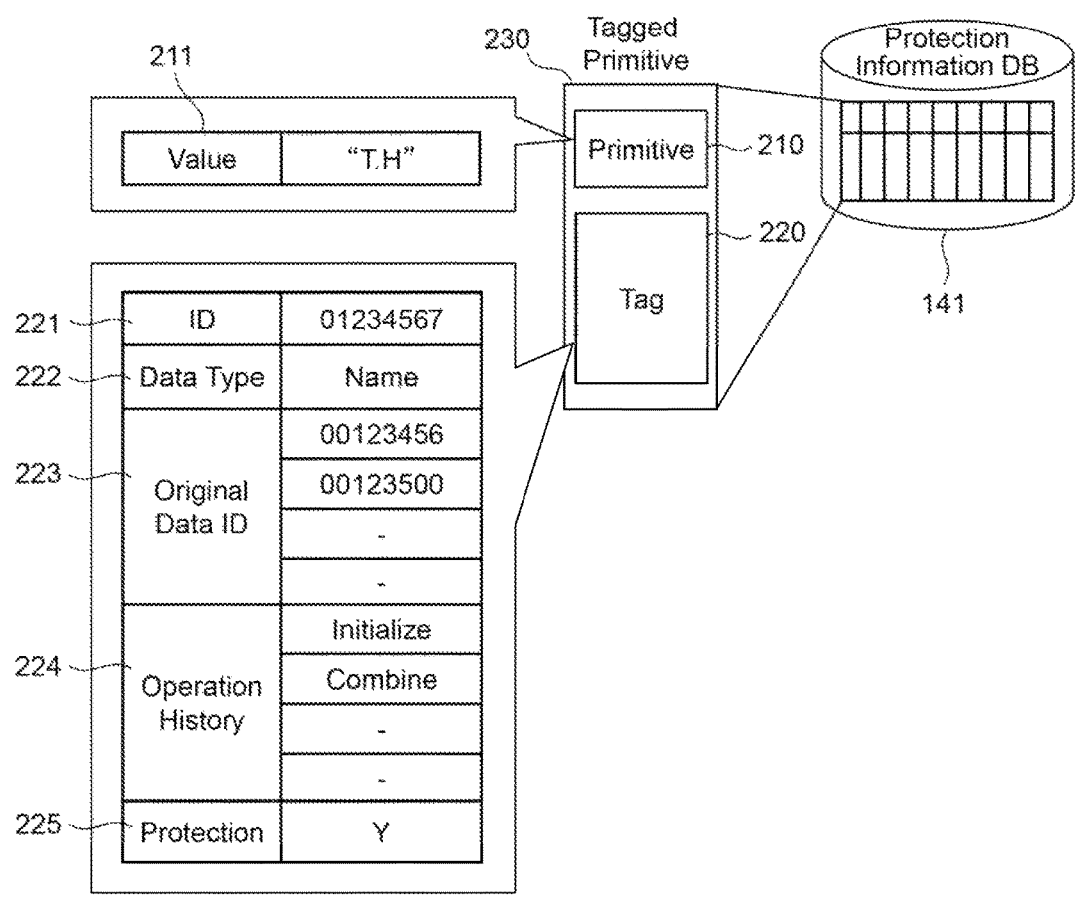
FIG. 2 is a diagram showing the structures of a primitive and a tag in accordance with an embodiment of the present invention.

FIG. 2 is a diagram showing the unit and the structure of the target data to be protected in accordance with an embodiment of the present invention. The target data to be protected of the present invention includes a primitive and a tag. The term "primitive" herein means not an aggregate of a variety of pieces of data, such as files, or character strings, but a fundamental, significant, minimum data unit that corresponds to a single numerical value or a character string, such as a name so that it can be distinguished from the aggregate data.

As shown in FIG. 2, a primitive 210 is processed in the server 110 as a tagged primitive 230 that is combined with a tag 220.

The tag 220 holds several attributes that supplement the meaning of a value 211 held by the primitive 210. Such attributes include an ID 221, a data type 222, an original data ID 223, an operation history 224, and the necessity/non-necessity of protection 225.

The ID 221 is information with a value that can be uniquely identified as a key for the server 110 to register the primitive 210 in the protection information DB 141 using the data management function 190.

The data type 222 is a content designated when the application program 155 reads the meaning of the primitive 210. Even when the value of the primitive 210 is a simple character string, the meaning of the primitive 210 differs depending on whether the content of the data type 221 is the "name," "blood type," or "place of work."

The original data ID 223 is information for, when the value of the primitive 210 is the one obtained as a result of performing an operation(s) on a different piece(s) of data in the past, identifying such data. As the original data ID 223, an ID of a tag that corresponds to another primitive or another complex is stored. The complex will be described with reference to FIG. 3.

The operation history 224 is used as information for, when the value of the primitive 210 is the one obtained as a result of performing an operation(s) once or more on a different piece(s) of data in the past, identifying the history of such operation(s).

The protection 225 is used as information for determining whether or not the data should be protected as the value of the primitive 210 is output to the outside of the server 110 and thus is referred to by an indefinite number of people. When the value of the protection 225 indicates "Y," the output management function 182 blocks transmission of the data to the data output execution program 181.

When the example in FIG. 2 is seen, it is found that data with a data ID=01234567 has a data type of "name" and derives from data with an ID=00123456 and data with an ID=00123500, and that operations of "initialization (i.e., representing a name in initial)" and "combination (i.e., execution of computation for combining character strings)" were executed to generate the data with the ID of 01234567.

It should be noted that when primitive data with the necessity/non-necessity of protection 225 indicating "Y" is deleted, it follows that data, which has been generated from such primitive data as the original data, also derives from the target data to be protected. Thus, such derived data may also be deleted.

<Configuration of Tagged Complex>

Figures 3, 4:
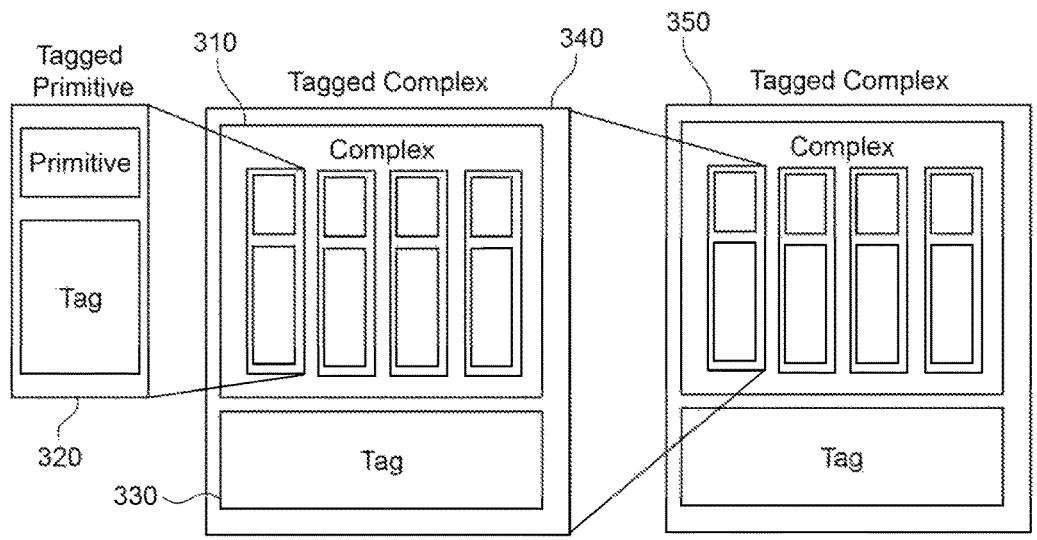
FIG. 3 is a diagram showing the structure of a complex in accordance with an embodiment of the present invention.
FIG. 4 is a diagram showing an exemplary structure of a tag-setting correspondence table in accordance with an embodiment of the present invention.

FIG. 3 is a diagram showing the structure of a tagged complex in accordance with an embodiment of the present invention. The term "complex" herein means data with a composite data structure as a set of tagged primitives. A tagged complex (e.g., a set of pieces of name data) has a larger data size than a tagged primitive (e.g., a single piece of name data). When the data size of a tagged complex is compared with that of an ordinary file, the data size of the ordinary file is typically larger.

A complex is used to handle, for example, a unit, which is obtained by combining tagged primitives with data types of "name," "height," and "weight," as "body measurement data" or "complete medical checkup data." The complex 310 is also provided with a tag 330 as with the tagged primitive 320 and is processed as a tagged complex 340 in the server 110.

A complex 350 can contain not only the tagged primitives 320 but also other tagged complexes 340 as the elements, and can be used for tagging data with a further complex hierarchical structure.

It should be noted that for the tagged complex 340, whether or not the data should be protected is determined in the stage of putting together the tagged primitive data 320 and the complex 340 in a hierarchical manner. Thus, "Y" or "N" is provided as the necessity/non-necessity of protection in the outermost field of the tag.

<Structure of Tag-setting Correspondence Table>

FIG. 4 is a diagram showing an exemplary structure of the tag-setting correspondence table in accordance with an embodiment of the present invention. The tag-setting correspondence table 163 is information prepared in advance, and contains data type 410, content of data 420, and protection 430 as the constituent items.

The data type 410 is information that corresponds to the data type 222 of the tag 220. The content 420 is information indicating the classification of the content of the primitive 210. In FIG. 4, "predetermined character string" indicates a sample name (i.e., default value), and "predetermined value" also indicates sample data (i.e., default value). "Other" indicates a specific name or a specific numerical value. The protection 430 is information indicating whether or not the data should be protected for a combination of the data type 410 and the content 420. The tag setting function 162 sets protection for the input data using the tag-setting correspondence table 163.

<Structure of Tag-updating Correspondence Table>

FIG. 5 is a diagram showing an exemplary structure of the tag-updating correspondence table in accordance with an embodiment of the present invention. The tag-updating correspondence table 173 is information prepared in advance, and contains data type 510, operation 520, protection tag inheritance 530, priority (i.e., weight) 540, and operation on history 550 as the constituent items.

The data type 510 is information that corresponds to the data type 222 of the tag 222. The operation 520 is information indicating the type of a data operation executed by the data operation execution program 171.

The protection tag inheritance 530 describes whether the value of the protection 225 currently set on the tag 220 for a combination of the data type 510 and the operation 520 should be inherited even after an operation is performed. In the protection tag inheritance 530, "inherit" means that protection of the data should be continued, while "change" means that protection of the data should be changed (Y→N or N→Y). The operation 520 may define not only the content of the latest operation performed but a history of a plurality of operations performed in the past. Thus, when just the data type 510 and the operation 520 are combined, the protection tag inheritance 530 may include a plurality of protection tag inheritances. Thus, information on the priority (i.e., weight) 540 is provided so that when the protection tag inheritance 530 includes a plurality of protection tag inheritances, a larger value of the priority 540 is used to adopt one of the inheritances. For example, when there are a protection tag inheritance 530 with a priority (i.e., weight) 540 of "1" and a protection tag inheritance 530 with a priority (i.e., weight) 540 of "2," the protection tag inheritance 530 with the priority (i.e., weight) 540 of "2" is adopted.

The operation on history 550 is information indicating the content of an operation to be performed on the past history with a higher priority 540 as with the protection tag inheritance 530. For example, the operation on history is "cleared" for data whose security level has been increased to a sufficient level by an operation. That is, when the operation on history 550 indicates "clear," the content of the operation history 224 in the tag 220 is entirely deleted. Meanwhile, when operation histories other than the latest operation history make no sense any more, a "cut" operation is performed on the histories. That is, when the operation on history 550 indicates "cut," all items except the last item of the operation history 224 are deleted.

<Tag Setting Process>

FIG. 6 is a flowchart for illustrating a tag setting process executed by the data input function in accordance with an embodiment of the present invention.

(i) Step 601: The data input function 160 receives a data read request together with the data type information 222 from the application program 155 via the data input I/F 151.

(ii) Step 602: The data input execution program 161 obtains input data from the outside.

(iii) Step 603: The tag setting function 162 sets the input data as a new primitive 210, and provides the tag 220 thereto. In addition, the tag setting function sets the tag so that the ID 221 of the tag 220 becomes unique in the system, and further sets the data type 222 on the tag 220.

(iv) Step 604: The tag setting function 162 determines the content to be set as the protection 225 from the tag-setting correspondence table 163 on the basis of the data type 222 and the value 211 of the primitive 210.

(v) Step 605: The tag setting function 162 requests the data management function 190 to register the tagged primitive 230 that has a pair of the primitive 210 and the tag 220. Then, the data management function 190 registers the tagged primitive 230 in the protection information DB 141.

(vi) Step 606: The data input function finally transmits the input data to the application program 155 via the data input I/F 151.

<Tag Updating Process>

Figure 7:
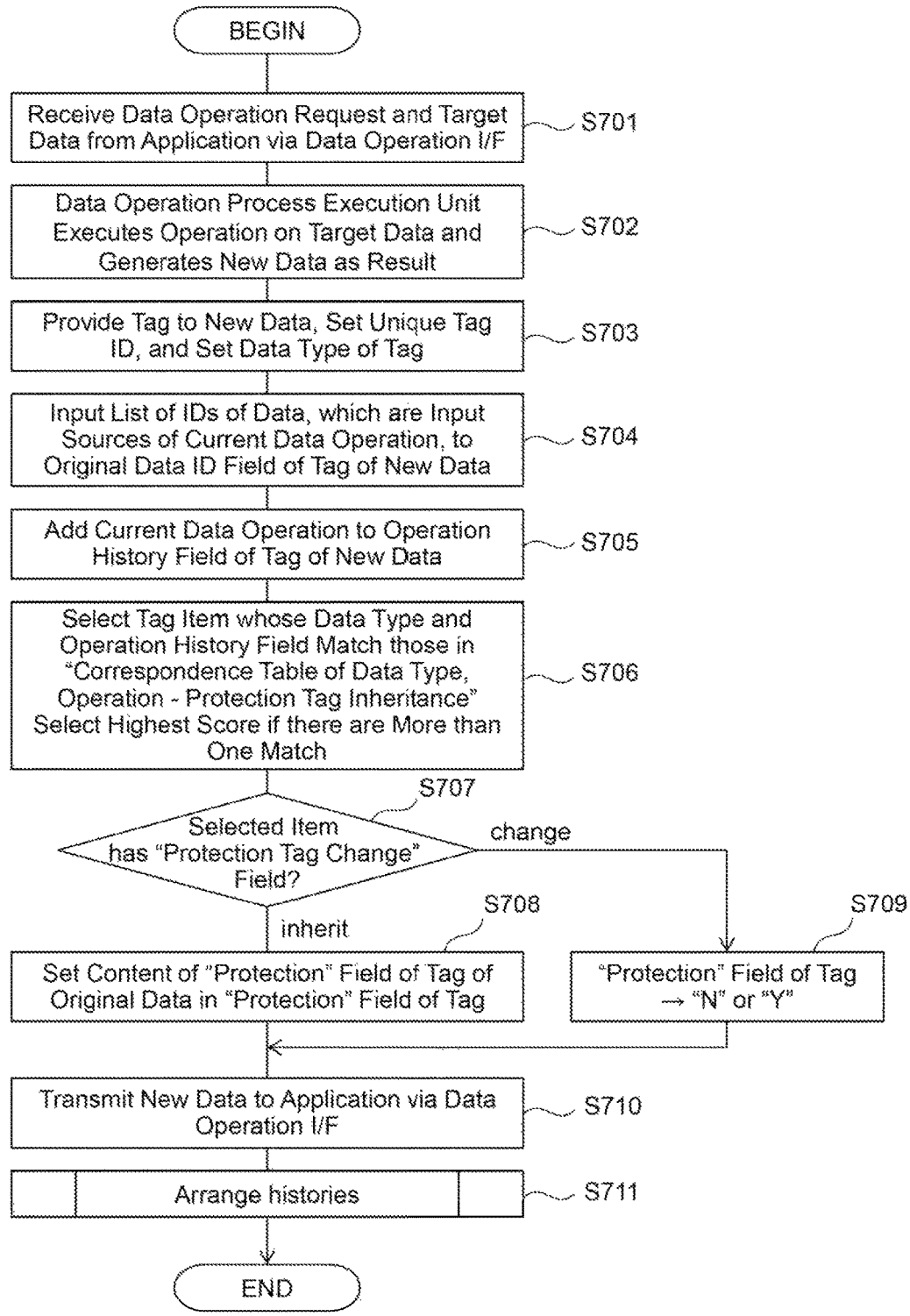
FIG. 7 is a flowchart for illustrating a process performed by a data operation function in accordance with an embodiment of the present invention.

FIG. 7 is a flowchart for illustrating a tag updating process executed by the data operation function in accordance with an embodiment of the present invention.

(i) Step 701: The data operation function 170 receives a data operation request together with the target data from the application program 155 via the data operation I/F.

(ii) Step 702: The data operation execution program 171 executes an operation on the target data in accordance with an instruction, and generates the resultant new data.

(iii) Step 703: The data operation execution program 171 provides a tag to the new data, sets a unique ID, and sets the data type.

(iv) Step 704: The data operation execution program 171 inputs a list of IDs of primitives or complexes, which are the input sources of the data operation, as the original data IDs of the tag.

(v) Step 705: The data operation execution program 171 adds the content of the current data operation to the operation history.

(vi) Step 706: The tag updating function 172 refers to the tag-updating correspondence table, and selects an item with a matching data type and operation history. If there are more than one match, an item with the highest priority value indicated in the priority field 550 is selected.

(vii) Step 707: The tag updating function 172 determines whether or not the protection tag inheritance field of the matched item indicates "inherit." If the protection tag inheritance field indicates "inherit," the process proceeds to step 708. Meanwhile, if the protection tag inheritance field indicates "change," the process proceeds to step 709.

(viii) Step 708: The tag updating function 172 sets the content of protection (e.g., "Y") of the tag of the primitive or the complex that is the target to be operated.

(ix) Step 709: If the protection tag inheritance field indicates "change," the tag updating function 172 changes the setting of the protection of the tag from "Y (protection)" to "N (non-protection)" or from "N (non-protection)" to "Y (protection)."

(x) Step 710: The tag updating function 172 transmits a new primitive or complex obtained as a result of the data operation to the application program 155 via the data operation I/F.

Figure 8:
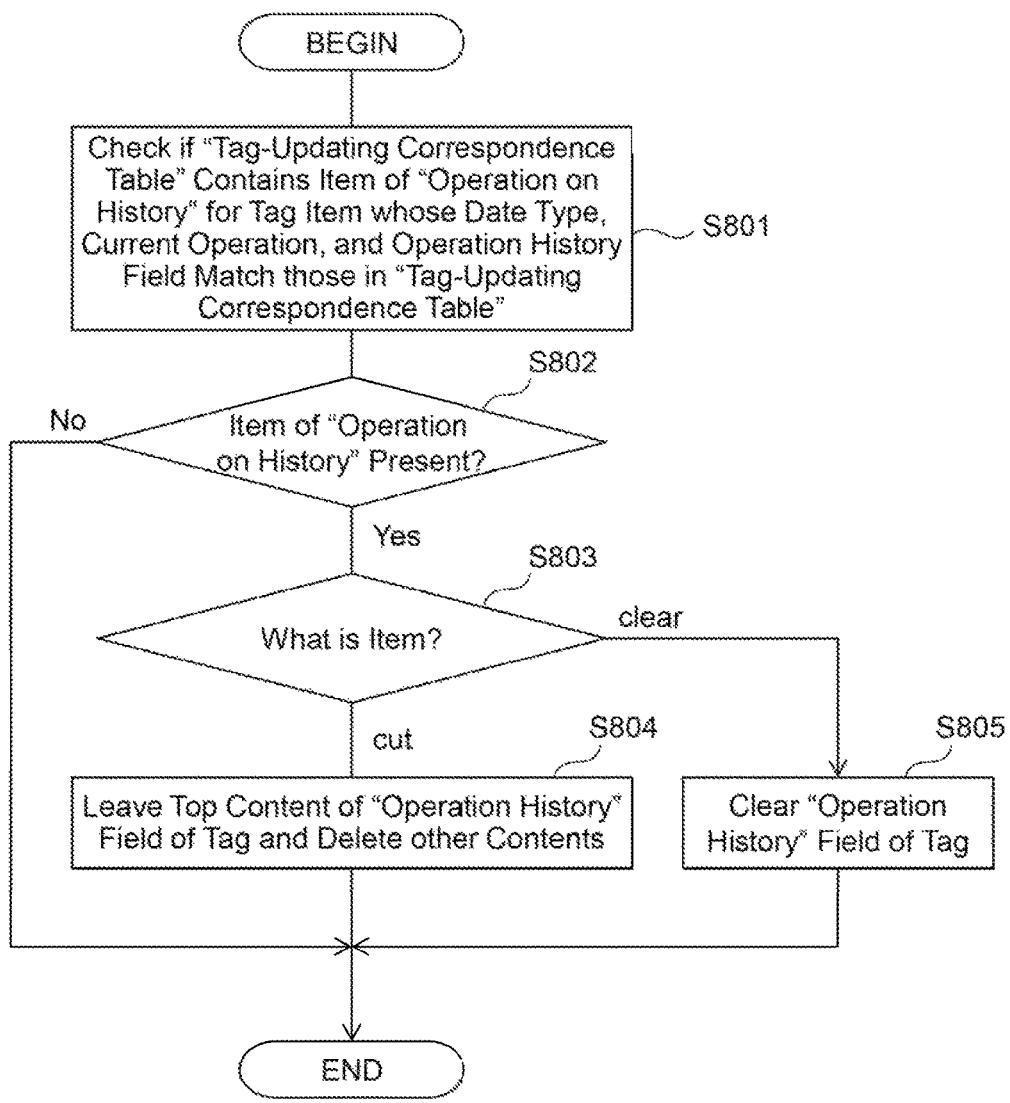
FIG. 8 is a flowchart for illustrating a process of arranging histories executed by a data operation function in accordance with an embodiment of the present invention.

(xi) Step 711: Finally, the data operation function 170 arranges the operation histories. FIG. 8 shows the details of the process in step 711.

<Process of Arranging Operation Histories>

FIG. 8 is a flowchart for illustrating a process of arranging histories in accordance with an embodiment of the present invention.

(i) Step 801: The data operation function 170 refers to the tag-updating correspondence table 173, and checks the content of the operation on history 550 for an item with a matching data type, currently performed operation, and past operation history recorded as the operation history.

(ii) Step 802: The data operation function 170 determines if the operation on history 550 contains any item. If it contains an item (i.e., if the answer to step 802 is Yes), the process proceeds to step 803. If it contains no item (i.e., if the answer to step 802 is No), the process of arranging operation histories terminates.

(iii) Step 803: The data operation function 170 further checks if the content of the item indicates "clear" or "cut." If the content of the item indicates "cut," the process proceeds to step 804. If the content of the item indicates "clear," the process proceeds to step 805.

(iv) Step 804: If the content of the item indicates "cut," the data operation function 170 leaves only the top content of the operation history, and deletes the other contents.

(v) Step 805: If the content of the item indicates "clear," the data operation function 170 clears all contents of the operation history.

<Blocking Output Policy>

FIG. 9 is a diagram showing an exemplary structure of a blocking output policy in accordance with an embodiment of the present invention. The blocking output policy 184 is a policy for, when input data is the target data to be protected, defining what data should be provided as an alternative output for the data.

The blocking output policy 184 contains application name 901, data type 902, alternative output 903, and content of alternative 904 as the constituent items. The application name 901 is information indicating the name of the executed application program 155. The data type 902 is information indicating the type of data that is a target of an output request. The alternative output 903 is information indicating whether or not alternative information, such as a character string, should be output when output of the requested data is blocked. The content of alternative 904 is information indicating the content to be output as the alternative.

<Data Output Process>

Figure 10:
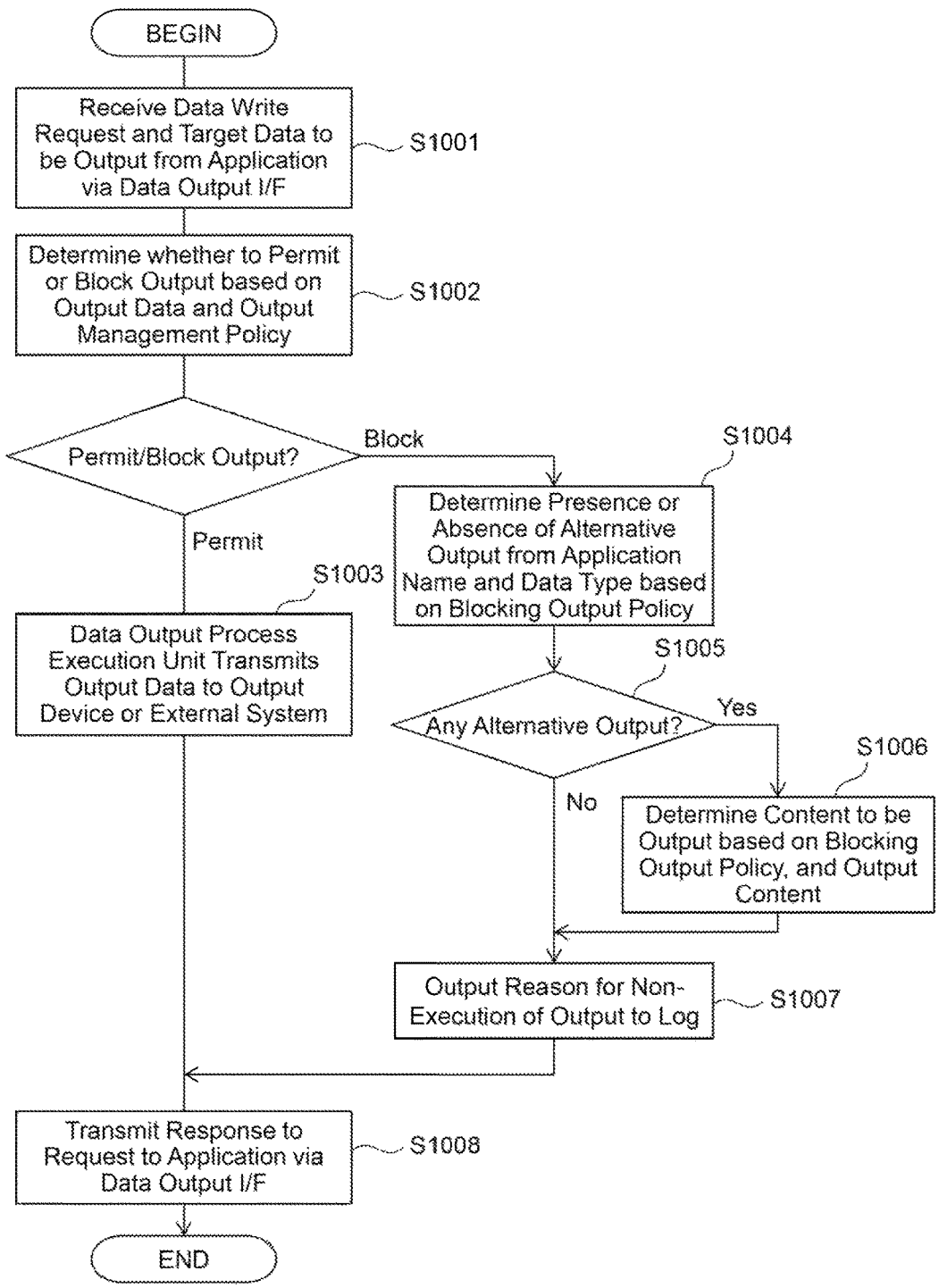
FIG. 10 is a flowchart for illustrating a process performed by a data output function in accordance with an embodiment of the present invention.

FIG. 10 is a flowchart for illustrating a data output process executed by the data output function in accordance with an embodiment of the present invention.

(i) Step 1001: The data output function 180 receives a data write request together with a primitive, which is a target to be output, from the application program 155 via the data output I/F 153.

(ii) Step 1002: The output management function 182 determines whether to permit or block output on the basis of the information indicating the necessity/non-necessity to protect the primitive as well as the output management policy 183. Specifically, when the value of the protection indicates "Y," the output is blocked, while when the value indicates "N," the output is permitted. If the output is permitted, the process proceeds to step 1003. If the output is blocked, the process proceeds to step 1004.

(iii) Step 1003: The data output execution program 181 transmits the output data to the external device 103 or to an external system (i.e., external server 102) via the network 101.

(iv) Steps 1004 and 1005: If the output is blocked, the output management function 182 refers to the blocking output policy 184 to see if there is any alternative output, and determines whether or not to output the alternative. If the alternative is to be output (i.e., if the answer to step 1005 is Yes), the process proceeds to step 1006. If the alternative is not to be output (i.e., if the answer to step 1005 is No), the process proceeds to step 1007.

(v) Step 1006: The output management function 182 determines the content to be output and outputs the content on the basis of the blocking output policy 184.

(vi) Step 1007: The data output function 180 outputs a log of a reason why the original data was not output regardless of whether or not the alternative was output.

(vii) Step 1008: Finally, the data output function 180 transmits a response to the request to the application program 155 via the data output I/F 153.

CONCLUSION

As described above, according to the embodiments of the present invention, it is possible to, when derived data is generated by performing an operation on the original data, if it becomes necessary to change the necessity/non-necessity to protect the data depending on the content of the operation performed on the data, correctly set information about the necessity/non-necessity to protect the data provided to the derived data.

The present invention can also be realized by a program code of software that implements the functions of the embodiments. In such a case, a storage medium having recorded thereon the program code is provided to a system or an apparatus, and a computer (or a CPU or a MPU) in the system or the apparatus reads the program code stored in the storage medium. In this case, the program code itself read from the storage medium implements the functions of the aforementioned embodiments, and the program code itself and the storage medium having recorded thereon the program code constitute the present invention. As the storage medium for supplying such a program code, for example, a flexible disk, CD-ROM, DVD-ROM, a hard disk, an optical disc, a magneto-optical disc, CD-R, a magnetic tape, a nonvolatile memory card, ROM, or the like is used.

Further, based on an instruction of the program code, an OS (operating system) running on the computer or the like may perform some or all of actual processes, and the functions of the aforementioned embodiments may be implemented by those processes. Furthermore, after the program code read from the storage medium is written to the memory in the computer, the CPU or the like of the computer may, based on the instruction of the program code, perform some or all of the actual processes, and the functions of the aforementioned embodiments may be implemented by those processes.

Moreover, the program code of the software that implements the functions of the embodiments may be distributed via a network, and thereby stored in storage means such as the hard disk or the memory in the system or the apparatus, or the storage medium such as CD-RW or CD-R, and at the point of use, the computer (or the CPU or the MPU) in the system or the apparatus may read the program code stored in the storage means or the storage medium and execute the program code.

Finally, it should be understood that the processes and technology described herein can be essentially implemented by not a specific device but any suitable combination of components. Further, a variety of types of general-purpose devices can be used in accordance with the teaching described herein. In order to execute the steps of the method described herein, constructing a dedicated device may be found to be advantageous. Further, a variety of inventions can be formed by appropriately combining a plurality of components disclosed in the embodiments. For example, some components may be removed from the whole components shown in the embodiments. Further, components in different embodiments may be combined as appropriate. Although the present invention has been described with reference to specific examples, they are not for limiting purposes but for illustrative purposes. One of ordinary skill in the art would appreciate that there is a number of combinations of hardware, software, and firmware that are suitable for implementing the present invention. For example, software description can be implemented by a wide range of programs or scripting languages, such as an assembler, C/C++, perl, Shell, PHP, and Java (registered trademark).

Further, in the aforementioned embodiments, the control lines and information lines represent those that are considered to be necessary for the description, and do not necessarily represent all control lines and information lines that are necessary for a product. All structures may be considered to be mutually connected.

REFERENCE SIGNS LIST

10 Computer system
100 Administrator terminal
101 Network
102 External server
103 External device
110 Server
120 CPU (processor)
130 Memory
140 Storage device
141 Protection information DB
142 Local protection policy
150 Program processing system
151 Data input I/F
152 Data operation I/F
153 Data output I/F
155 Application program
160 Data input function
161 Data input program
162 Tag setting function
163 Tag-setting correspondence table
170 Data operation function
171 Data operation execution program
172 Tag updating function
173 Tag-updating correspondence table
180 Data output function
181 Data output execution program
182 Output management function
183 Output management policy
184 Blocking output policy
190 Data management function

The invention claimed is:

1. A method for processing data output from a computer system including a storage device and a processor, comprising:
   reading, with the processor, primitive data from the storage system, the primitive data being a minimum unit of information;
   reading, with the processor, the primitive data as original data from the storage system, the primitive data having the protection attribute set thereon;
   performing, with the processor, an operation on the original data to generate derived data;
   determining, with the processor, whether to make the derived data inherit the protection attribute of the original data by comparing the content of the operation performed on the original data with information for updating the protection attribute set in advance;
   determining, with the processor, a protection attribute of the primitive data on the basis of a type and a content of the primitive data, and,
   providing, with the processor, tag data containing the protection attribute to the derived data as the primitive data, wherein the tag data further contains a data type of the derived data, information on the original data that is a source of generation of the derived data, and history information on an operation executed to generate the derived data,
   wherein the tag data further contains a data type of the derived data, information on the original data that is a source of generation of the derived data, and history information on an operation executed to generate the derived data.

2. The data management method according to claim 1, further comprising determining, with the processor, the protection attribute of the primitive data by comparing the type and the content of the primitive data with information for setting the protection attribute set in advance.

3. The data management method according to claim 1, further comprising changing, with the processor, a content of the history information on the operation on the basis of the content of the operation performed on the original data.

4. The data management method according to claim 1, wherein
   the information for updating the protection attribute contains information indicating a priority for the content of the operation executed on the original data to generate the derived data, and
   the method further comprises, when the derived data is generated as a result of a plurality of types of operations having been executed, causing the processor to refer to the information indicating the priority contained in the information for updating the protection attribute, and make the derived data, which corresponds to a content of an operation with a high priority, inherit the protection attribute of the original data.

5. The data management method according to claim 1, further comprising:
   determining, with the processor, whether to permit output of the derived data with reference to the protection attribute of the derived data in response to a request to output the derived data from outside; and
   outputting, with the processor, data by changing a content of the derived data if output of the derived data is not permitted.

6. The data management method according to claim 5, further comprising determining, with the processor, to change the content of the derived data with reference to a blocking output policy, the blocking output policy having a content of an alternative output defined in advance.

7. A non-transitory computer-readable medium storing a program for causing a computer to execute a method for processing data output, the program comprising causing the computer to perform:
   a process of reading primitive data from the storage system, the primitive data being a minimum unit of information;
   a process of reading the primitive data as original data from the storage system, the primitive data having the protection attribute set thereon;
   a process of performing an operation on the original data to generate derived data;
   a process of determining whether to make the derived data inherit the protection attribute of the original data by comparing the content of the operation performed on the original data with information for updating the protection attribute set in advance;
   a process of determining a protection attribute of the primitive data on the basis of a type and a content of the primitive data,
   a process of providing tag data containing the protection attribute to the derived data as the primitive data, wherein the tag data further contains a data type of the derived data, information on the original data that is a source of generation of the derived data, and history information on an operation executed to generate the derived data,
   wherein the tag data further contains a data type of the derived data, information on the original data that is a source of generation of the derived data, and history information on an operation executed to generate the derived data.

* * * * *